United States Patent
Becerra, Sr. et al.

(10) Patent No.: US 8,127,223 B2
(45) Date of Patent: Feb. 28, 2012

(54) USER INTERFACE METHOD AND APPARATUS FOR DATA FROM DATA CUBES AND PIVOT TABLES

(75) Inventors: Santiago Becerra, Sr., Del Mar, CA (US); Quinton Alsbury, Venice, CA (US); Jaime Zuluaga, Fremont, CA (US); David Becerra, Marina del Rey, CA (US); Claire B. Maytum, San Diego, CA (US)

(73) Assignee: MeLLmo Inc., Solana Beach, CA (US)

( * ) Notice: Subject to any disclaimer, the term of this patent is extended or adjusted under 35 U.S.C. 154(b) by 351 days.

(21) Appl. No.: 12/197,893

(22) Filed: Aug. 25, 2008

(65) Prior Publication Data

US 2009/0187815 A1 Jul. 23, 2009

Related U.S. Application Data

(60) Provisional application No. 61/023,058, filed on Jan. 23, 2008.

(51) Int. Cl.
*G06F 15/00* (2006.01)
(52) U.S. Cl. ........................ 715/212; 715/214
(58) Field of Classification Search .............. 715/212
See application file for complete search history.

(56) References Cited

U.S. PATENT DOCUMENTS

| | | |
|---|---|---|
| 5,724,985 A | 3/1998 | Snell et al. |
| 6,707,454 B1 * | 3/2004 | Barg et al. .............. 345/440 |
| 6,920,608 B1 | 7/2005 | Davis |
| 2003/0055776 A1 | 3/2003 | Samuelson |
| 2005/0003870 A1 | 1/2005 | Nakano et al. |
| 2005/0060300 A1 * | 3/2005 | Stolte et al. .............. 707/3 |
| 2006/0010149 A1 * | 1/2006 | Mattern .............. 707/101 |
| 2006/0010159 A1 * | 1/2006 | Mirchandani et al. ....... 707/102 |
| 2006/0020921 A1 * | 1/2006 | Pasumansky et al. ....... 717/124 |
| 2006/0031187 A1 * | 2/2006 | Pyrce et al. .............. 707/1 |
| 2006/0206512 A1 * | 9/2006 | Hanrahan et al. ........... 707/102 |
| 2006/0284745 A1 | 12/2006 | Cameron |
| 2007/0055943 A1 | 3/2007 | McCormack et al. |
| 2007/0189737 A1 | 8/2007 | Chaudhri et al. |
| 2007/0239724 A1 | 10/2007 | Ramer et al. |
| 2008/0014917 A1 | 1/2008 | Rhoads et al. |
| 2008/0174570 A1 | 7/2008 | Jobs et al. |
| 2008/0258881 A1 | 10/2008 | Manson et al. |
| 2009/0070705 A1 | 3/2009 | Ording |

OTHER PUBLICATIONS

PCT/US09/31861 International Search Report and Written Opinion dated Jan. 24, 2010.
Johnson, S.—Perception, Inc., "Show Me Microsoft Office Excel 2003," Sep. 24, 2003, Chapter 4, pp. 137-140.

(Continued)

*Primary Examiner* — Cesar Paula
*Assistant Examiner* — Nathan Hillery
(74) *Attorney, Agent, or Firm* — Fenwick & West LLP

(57) ABSTRACT

Systems, methods, and computer readable media provide space-efficient user interfaces to data cubes and pivot table information. Because the user interfaces are more efficient in usage of display area, smaller displays can be used more effectively in reviewing such data. The user interfaces provide a multi-dimensional navigation approach among dimensions represented in the data, which allows users to more easily maintain context when reviewing large pivot table reports, and the like. Other user interface features that ease review of such reports on smaller devices also are disclosed.

9 Claims, 21 Drawing Sheets

OTHER PUBLICATIONS

PCT International Search Report and Written Opinion, PCT Application No. PCT/US2010/01047, Jun. 15, 2010, twelve pages.
Wikipedia, Inc.,"OLAP Cube," Sep. 2, 2011, six pages. [Online] [Retrieved on Oct. 24, 2011] Retrieved from the Internet <URL:http://en.wikipedia.org/wiki/OLAP_cube.>.
Wikipedia, Inc.,"Pivot Table," Oct. 23, 2011,five pages. [Online] [Retrieved on Oct. 24, 2011] Retrieved from the Internet <URL:http://en.wikipedia.org/wiki/Online_analytical_processing.>.

* cited by examiner

| | A | B | C | D | E | F | G | H |
|---|---|---|---|---|---|---|---|---|
| 1 | Region | Territory | Business Type | Product | Year | Quarter | Month | Sales |
| 2 | Americas | East | Retail | Product 2 | 2006 | Q1 | February | $88,424 |
| 3 | Europe | East | Retail | Product 3 | 2006 | Q1 | February | $89,984 |
| 4 | Asia | West | Retail | Product 2 | 2006 | Q1 | February | $78,110 |
| 5 | Americas | East | Retail | Product 2 | 2007 | Q1 | February | $79,649 |
| 6 | Americas | East | Retail | Product 1 | 2007 | Q1 | February | $67,509 |
| 7 | Europe | East | Corporate | Product 3 | 2007 | Q1 | February | $57,296 |
| 8 | Asia | East | Corporate | Product 1 | 2008 | Q1 | February | $61,682 |
| 9 | Americas | West | Corporate | Product 4 | 2008 | Q1 | February | $67,629 |
| 10 | Americas | West | Corporate | Product 4 | 2008 | Q1 | February | $80,576 |
| 11 | Europe | East | Retail | Product 3 | 2008 | Q1 | February | $59,712 |
| 12 | Europe | West | Corporate | Product 4 | 2008 | Q1 | February | $67,629 |
| 13 | Europe | West | Corporate | Product 4 | 2008 | Q1 | February | $80,576 |
| 14 | Asia | West | Retail | Product 2 | 2006 | Q1 | February | $66,833 |
| 15 | Americas | East | Corporate | Product 1 | 2006 | Q1 | January | $72,572 |
| 16 | Europe | East | Corporate | Product 4 | 2006 | Q1 | January | $51,105 |
| 17 | Asia | Central | Corporate | Product 3 | 2006 | Q1 | January | $57,148 |

FIG. 1 (Prior Art)

| | A | B | C |
|---|---|---|---|
| 1 | Sum of Sales | | |
| 2 | | | |
| 3 | | | |
| 4 | Region | Territory | Business Type |
| 5 | Americas | Central | Corporate |
| 6 | | | Retail |
| 7 | | Central Total | |
| 8 | | East | |
| 9 | | West | |
| 10 | Americas Total | | |
| 11 | Asia | Central | Corporate |
| 12 | | | Retail |
| 13 | | Central Total | |
| 14 | | East | |
| 15 | | West | |
| 16 | Asia Total | | |
| 17 | Europe | Central | Corporate |
| 18 | | | Retail |
| 19 | | Central Total | |
| 20 | | East | |
| 21 | | West | |
| 22 | Europe Total | | |
| 23 | Grand Total | | |

FIG. 2A (Prior Art)

FIG. 2A (Cont.) (Prior Art)

FIG. 3 (Prior Art)

| | A | B | C | D | E |
|---|---|---|---|---|---|
| 1 | Sum of Sales | | | | Year ▼ |
| 2 | | | | | 2006 |
| 3 | | | | | |
| 4 | Region ▼ | Territory ▼ | Business Type ▼ | Product ▼ | |
| 5 | Americas | Central | | | 251,325 |
| 6 | | East | | | 275,239 |
| 7 | | West | | | 324,865 |
| 8 | Americas Total | | | | 851,429 |
| 9 | Asia | Central | | | 297,015 |
| 10 | | East | | | 264,742 |
| 11 | | West | | | 197,303 |
| 12 | Asia Total | | | | 759,060 |
| 13 | Europe | Central | | | 282,628 |
| 14 | | East | | | 295,497 |
| 15 | | | | | 240,407 |
| 16 | Europe Total | | | | 818,532 |
| 17 | Grand Total | | | | 2,429,021 |

Sum of Sales

Region ▼ Territory ▼ Busin (Show All)
☑ Americas
☑ Asia
☑ Europe

OK    Cancel

Fast

| | A | B | C | D | E |
|---|---|---|---|---|---|
| 1 | Sum of Sales | | | | Year ▼ |
| 2 | | | | | 2006 |
| 3 | | | | | |
| 4 | Region ▼ | Territory ▼ | Business Type ▼ | Product ▼ | |
| 5 | Americas | Central | Corporate | Product 1 | 165,478 |
| 6 | | | | Product 2 | |
| 7 | | | | Product 3 | |
| 8 | | | | Product 4 | |
| 9 | | | Corporate Total | | 165,478 |
| 10 | | | Retail | | 85,847 |
| 11 | | Central Total | | | 251,325 |
| 12 | | East | | | 275,239 |
| 13 | | West | | | 324,865 |
| 14 | Americas Total | | | | 851,429 |
| 15 | Asia | Central | Corporate | Product 1 | |
| 16 | | | | Product 3 | 159,424 |
| 17 | | | Corporate Total | | 159,424 |
| 18 | | | Retail | | 137,591 |
| 19 | | Central Total | | | 297,015 |
| 20 | | East | | | 264,742 |
| 21 | | West | | | 197,303 |
| 22 | Asia Total | | | | 759,060 |
| 23 | Europe | Central | Corporate | Product 1 | 129,405 |
| 24 | | | | Product 3 | |
| 25 | | | Corporate Total | | 129,405 |
| 26 | | | Retail | | 153,223 |
| 27 | | Central Total | | | 282,628 |
| 28 | | East | | | 295,497 |
| 29 | | West | | | 240,407 |
| 30 | Europe Total | | | | 818,532 |
| 31 | Grand Total | | | | 2,429,021 |

FIG. 4 (Prior Art)

|   | A | B | C | D | E |
|---|---|---|---|---|---|
| 1 | Sum of Sales | | | | Year |
| 2 | | | | | 2006 |
| 3 | | | | | |
| 4 | Region | Territory | Business Type | Product | |
| 5 | Americas | Central | Corporate | | 165,478 |
| 6 | | | Retail | | 85,847 |
| 7 | | | Central Total | | 251,325 |
| 8 | | East | | | 275,239 |
| 9 | | West | | | 324,865 |
| 10 | Americas Total | | | | 851,429 |
| 11 | Asia | Central | Corporate | | 159424 |
| 12 | | | Retail | | 137,591 |
| 13 | | | Central Total | | 297,015 |
| 14 | | East | | | 264,742 |
| 15 | | West | | | 197,303 |
| 16 | Asia Total | | | | 759,060 |
| 17 | Europe | Central | Corporate | | 129,405 |
| 18 | | | Retail | | 153,223 |
| 19 | | | Central Total | | 282,628 |
| 20 | | East | | | 295,497 |
| 21 | | West | | | 240,407 |
| 22 | Europe Total | | | | 818,532 |
| 23 | Grand Total | | | | 2,429,021 |

FIG. 5 (Prior Art)

|   | A | B | C | D | E | F | G | H | I | J | K | L |
|---|---|---|---|---|---|---|---|---|---|---|---|---|
| 1 |   |   |   |   |   |   |   |   |   |   |   |   |
| 2 |   |   |   |   |   |   |   |   |   |   |   |   |
| 3 | Sum of Sal |   |   |   | Year ▼ | Quarter ▼ | Month ▼ |   |   |   |   |   |
| 4 |   |   |   |   | 2006 |   |   |   |   |   |   |   |
| 5 |   |   |   |   | Q1 | Q2 | | | | Q2 Total | Q3 | | |
| 6 | Region ▼ | Territor ▼ | Busines ▼ | Product ▼ |   | April | May | June |   | July | August | September |
| 7 | Americas | Central | Corporate | Product 1 | 46894 |   |   |   |   |   |   | 48892 |
| 8 |   |   |   | Product 2 |   |   |   |   |   |   |   |   |
| 9 |   |   |   | Product 3 |   |   |   |   |   |   |   |   |
| 10 |   |   |   | Product 4 |   |   |   |   |   |   |   |   |
| 11 |   |   | Corporate Total |   | 46894 |   |   |   |   |   |   | 48892 |

FIG. 6 (Prior Art)

|   | A | B | C | D |
|---|---|---|---|---|
| 1 | Sum of Sales | | | |
| 2 | | | | |
| 3 | | | | |
| 4 | Region ▼ | Territory ▼ | Business Type ▼ | Product ▼ |
| 5 | Americas | Central | Corporate | |
| 6 | | | Retail | |
| 7 | | Central Total | | |
| 8 | | East | | |
| 9 | | West | | |
| 10 | Americas Total | | | |
| 11 | Asia | Central | Corporate | |
| 12 | | | Retail | |
| 13 | | Central Total | | |
| 14 | | East | | |
| 15 | | West | | |
| 16 | Asia Total | | | |
| 17 | Europe | Central | Corporate | |
| 18 | | | Retail | |
| 19 | | Central Total | | |
| 20 | | East | | |
| 21 | | West | | |
| 22 | Europe Total | | | |
| 23 | Grand Total | | | |

FIG. 7 (Prior Art)

| E | F | G | AD | AE | AF |
|---|---|---|---|---|---|
| Year ▼ | Month ▼ | Quarter ▼ | | | |
| 2006 | 2007 | 2008 | | 2008 Total | Grand Total |
| | | January | December Total | | |
| | | Q1 | | | |
| 165,478 | 396,366 | 114,691 | | 349,802 | 911,646 |
| 85,847 | 134,646 | 72,636 | | 434,644 | 655,137 |
| 251,325 | 531,012 | 187,327 | | 784,446 | 1,566,783 |
| 275,239 | 543,115 | | 248,522 | 812,208 | 1,630,562 |
| 324,865 | 516,116 | | 138,389 | 1,161,908 | 2,002,889 |
| 851,429 | 1,590,243 | 187,327 | 386,911 | 2,758,562 | 5,200,234 |
| 159,424 | 84,386 | 67,307 | | 302,418 | 546,228 |
| 137,591 | 183,213 | | | 232,681 | 553,485 |
| 297,015 | 267,599 | 67,307 | | 535,099 | 1,099,713 |
| 264,742 | 365,190 | | 248,522 | 685,501 | 1,315,433 |
| 197,303 | 145,966 | | 138,389 | 1,015,384 | 1,358,653 |
| 759,060 | 778,755 | 67,307 | 386,911 | 2,235,984 | 3,773,799 |
| 129,405 | 92,912 | 114,691 | | 403,237 | 625,554 |
| 153,223 | 126,144 | 72,636 | | 434,644 | 714,011 |
| 282,628 | 219,056 | 187,327 | | 837,881 | 1,339,565 |
| 295,497 | 251,863 | 49,224 | 248,522 | 844,872 | 1,392,232 |
| 240,407 | 257,320 | | | 785,945 | 1,283,672 |
| 818,532 | 728,239 | 236,551 | 248,522 | 2,468,698 | 4,015,469 |
| 2,429,021 | 3,097,237 | 491,185 | 1,022,344 | 7,463,244 | 12,989,502 |

FIG. 7 (Cont.) (Prior Art)

| | 2008 | 2007 |
|---|---|---|
| Area 1 | $2,078,259 | $4,078,259 |
| Area 2 | $1,190,256 | $3,254,879 |
| Area 3 | $1,078,259 | $1,058,781 |
| Area 4 | $5,886,543 | $567,008 |
| Area 5 | $1,432,899 | $2,567,854 |
| Area 6 | $3,214,569 | $6,543,232 |
| Area 7 | $1,256,876 | $2,435,611 |
| Area 8 | $2,674,999 | $432,776 |
| TOTAL | $24,195,476 | $27,185,608 |

FIG. 25

| | 2007 | 2006 |
|---|---|---|
| Americas | $1,590,243 | $851,429 |
| Asia | $778,755 | $759,060 |
| Europe | $728,239 | $818,532 |

FIG. 26

| | 2008 | 2007 |
|---|---|---|
| Americas | $2,758,562 | $1,590,243 |
| Asia | $2,235,984 | $778,755 |
| Europe | $2,468,698 | $728,239 |

FIG. 24

| (0,0) | 08 | 2007 | | | | | |
|---|---|---|---|---|---|---|---|
| Americas | 758,562 | $1,590,243 | | | | | |
| Asia | 235,984 | $778,755 | | | | | |
| Europe | 468,698 | $728,239 | | | | | |
| | | | | | | | |
| | | | | | | | |
| | | | | | | | |
| TOTAL | 3,244 | $3,097,237 | | | | | |

FIG. 29

| | 2008 | |
|---|---|---|
| | Quarter 1 | Quarter 2 |
| Americas | $681,666 | $670,156 |
| Asia | $288,415 | $584,370 |
| Europe | $735,826 | $670,156 |
| TOTAL | $1,705,907 | $1,924,682 |

FIG. 30

| | 2008 | |
|---|---|---|
| | Quarter 1 | |
| | Jan | Feb |
| Americas | $187,327 | $346,134 |
| Asia | $67,307 | $154,275 |
| Europe | $236,551 | $291,358 |
| TOTAL | $491,185 | $422,955 |

FIG. 31

| | ▽ Quarter 1 | |
|---|---|---|
| | January | |
| | Week 1 | Week |
| ▽ Central | | |
| Product 1 | $9,771 | $9, |
| Product 2 | $0 | |
| Product 3 | $0 | |
| Product 4 | $0 | |
| Corporate | | |
| TOTAL | $9,771 | $9,9 |

| | Quarter 1 | Quarter 2 |
|---|---|---|
| Central | $681,666 | $670,156 |
| East | $288,415 | $584,370 |
| West | $735,826 | $670,156 |

Americas / 2008 (3405, 3410)

FIG. 34

| | 2008 | 2007 |
|---|---|---|
| Corporate | $349,802 | $396,3 |
| Retail | $434,644 | $134, |
| TOTAL | $784,446 | $531,0 |

Americas / Central

FIG. 33

| | 2008 | 2007 |
|---|---|---|
| Central | $784,446 | $531, |
| East | $812,208 | $543, |
| West | $1,161,908 | $516, |
| TOTAL | $2,758,562 | $1,590, |

Americas

FIG. 32

USER INTERFACE METHOD AND APPARATUS FOR DATA FROM DATA CUBES AND PIVOT TABLES

CROSS-REFERENCE TO RELATED APPLICATIONS

This application claims the benefit of U.S. Provisional Application No. 61/023,058, entitled "CUBE NAVIGATOR," filed Jan. 23, 2008, and which is incorporated herein by reference in its entirety.

BACKGROUND OF THE INVENTION

1. Field of the Invention

The invention in general relates to user interfaces for electronic devices, and more particularly to user interfaces for reviewing summarizations of tabular data on electronic devices with smaller displays.

2. Description of the Related Art

A common example of tabular data is a spreadsheet having a plurality of columns, each with a column title indicative of a different data dimension that respectively can have multiple values. Selections of the values are provided in rows, and often a respective numerical quantity is associated with the value selections of each row. An example excerpt from a spreadsheet is illustrated in FIG. 1. Because tabular data can have a number of different dimensions associated with many individual entries, it can be difficult to extract meaning and higher-level conclusions from the data. For example, in a spreadsheet that organizes sales by geographic region and by time-related dimensions (example in FIG. 1), there often will be a separate row entry for each item of sales data for each combination of geographic region and time span. So without a way to produce summaries of the data for higher-level geographic regions and time spans, it may be difficult to make higher-level conclusions from such data.

Pivot tables and data cubes provide mechanisms that can help with aggregating large data sets into summarizations that are more easily digestable, and hence useful for analysis. One view of a data cubes (sometimes also called an OLAP cube) is that a data cube is an extension to the two-dimensional array of a spreadsheet. An example usage for a data cube is that a financial analyst might want to view different summarizations of a data set. FIG. 1 is further described to provide a more specific example.

FIG. 1 shows a screen capture 101 of a portion of a spreadsheet of sales data 115 (column H as depicted) and associated with each row entry of sales data 115 are a plurality of dimensions collectively identified as 106, and which include Region, Territory, Business Type, Year 116, Quarter 117, and Month 118 (Year 116, Quarter 117, and Month 118 are separately numbered and provide an example of a natural hierarchical arrangement of dimensions). Each of these dimensions 105 has a plurality of values, and a selection of a value for each dimension is associated with a particular entry in sales data 115. For example, row 2 includes the value "Americas" for the region dimension and "2006" for the Year dimension associated with the Sales value 88,424.

Since this form of tabular data does not provide any sort of summarization of the sales data 115 according to any of the associated dimensions, mechanisms exist to help with that data summarization, one example of such mechanisms is a pivot table, and another related tool is a data cube. A pivot table is a data summarization tool found in data visualization programs such as spreadsheets. Among other functions, it can automatically sort, count, and total the data stored in one table or spreadsheet and create a second table displaying the summarized data. Pivot tables are useful to create crosstabs quickly. The user sets up and changes the summary's structure by dragging-and-dropping fields graphically. This "rotation" or pivoting of the summary table gives the concept its name.

FIG. 2A shows a screen shot 201 of a portion of a pivot table that can be created from the spreadsheet of FIG. 1. A Sum of Sales 205 is what has been selected to be summarized in the entries of the data columns, starting with column E. Dimensions Region (110), Territory, Business Type, and Product were selected to be dimensions that will cause row-based organization of the pivot table, while the naturally hierarchical dimensions Year, Month, and Quarter were selected as dimensions that will cause column-based organization of the pivot table. Values Americas 105a and Asia 105b are separately identified values within Region dimension 110. Each dimension selected for row-based organization appears in a separate column across a top portion of the pivot table, and are collectively identified as 210.

Since the sum of sales 205 was selected, the values presented at the intersections between the rows and columns present a sum of sales for the values of the dimensions corresponding to those respective rows and columns. For example, column E, row 5 depicts a sum of sales for 2006 for the Corporate business type, within the Central Territory, within the Americas Region.

Each dimension includes a drop down arrow that when selected results in appearance of a picklist, as shown in FIG. 2B for the example dimension Region. By selecting or unselecting values in this picklist, data for different values of the Region dimension can be shown or not shown. At least one value for each dimension must be selected, or the main pivot table organization must be revisited to remove that dimension (e.g., at least one region must be selected). As will be shown below, more granularity or less granularity of data specificity can be obtained by double clicking on different values for the row-based and column-based dimensions. Such double-clicking results in certain behaviors, some of which are summarized below.

Both the spreadsheet and the pivot table of these examples are very modest in size, and actual pivot tables can be substantially bigger in terms of the amount of data, including a number of dimensions, and a number of values appearing in each dimension (e.g., a SKU dimension could have hundreds of entries, a large retail chain could have hundreds of stores and thousands of SKUs). Thus, a pivot table can be extremely large.

Users have managed to use such pivot tables to advantage, and have benefitted from relatively large and still growing screen sizes available on desktop computers. However, mobile devices are proliferating and growing in an amount of available computer power. It would be desirable to be able to access such pivot tables from mobile devices, including laptops, smart phones and the like. These devices generally have smaller screens, and usually, more portable devices, such as smart phones have even smaller screens that portable devices such as laptops.

FIG. 2A illustrates an example display 220 of a mobile device, such that anything within the interior of display 220 would be what is viewed by a user of the mobile device. Thus, FIG. 2A further illustrates that a user of a mobile device having display 220 would be able to view only a very limited portion of even the small pivot table here.

FIG. 3 illustrates display 220 superimposed on another view of the same pivot table. Comparing FIG. 2A to FIG. 3, the difference between them illustrates that a user can double click on the "Central" value of the Territory dimension for the Americas region (i.e., Row 5, Column B contains the value "Central" for the Territory dimension, and this row also corresponds to the value "Americas" of the Region dimension. The pivot table responds by causing all the values for the Business Type and Product dimensions to be hidden, for all of the values of the Region dimension (i.e., including for values "Asia" and "Europe"). However, even with all of that extra detail hidden, not much of the pivot table can be viewed at one time, and it is apparent, for example, that data values even for the first year 2006 would not be visible at the same time as the Territory values to which those data values correspond.

FIG. 4 illustrates a further view 401 of the same pivot table, also having display 220 superimposed thereon. In view 401, a more expanded view of the row dimensions (See FIG. 2A) are depicted. This view 401 can be arrived at from the pivot table view of FIG. 3 first by double clicking on any of the Central values for any of the Regions (e.g., either the Central value for the Americas or Asia Region can be clicked, with the same result), then any of the then displayed Corporate values of Business type are double clicked, resulting in display of the Product values shown in view 401 (identified as 411, 312, and 413). At each step, a summarization of sales would be shown in the field data appropriate for that view. In other words, after one double click on Central, then corporate and retail values would be shown, and sales summarization for 2006 would be shown in column E.

From the view of FIG. 4, the view of FIG. 3 can be obtained again by double clicking only on any of the Central values of any Territory (i.e., the entire expanded view collapses with one double click.) However, the pivot table, if any of the Central regions is again clicked, would return to the view of FIG. 4, and would not first display only sum of sales data for Business type, for example. In other word, the pivot table remembers a previous degree of expansion and returns to that degree, rather than going through intermediate values. To cause the pivot table to traverse the intermediate dimensions requires double clicking on each intermediate dimension.

FIG. 5 illustrates an example of the same pivot table, where the Corporate value 505 in Row 5, Column C was selected, causing all the Product dimension values to be hidden. If the Central value of Column B, Row 5 were then double clicked, the view would return to that of FIG. 3, and if that Central value were double clicked again, the view would return to that of FIG. 5, not that of FIG. 4.

FIG. 6 also illustrates a screen capture 601 of a portion of the same pivot table. FIG. 6 is for illustrating another behavior of a pivot table. FIG. 6 illustrates that the column dimensions are expanded, such that the Year 2006 dimension also has displayed Q1, Q2, and Q3. Q2 has displayed months April, May, and June. The months April, May, and June were shown after double clicking on the Q2 value 605. The data values appearing in columns to the right of Q2 were moved farther to the right after displaying the constituent values under Q2. In other words, all that data still appears on the same page, and horizontally or vertically scrolling could cause portions of that data to be displayed within a display window.

FIG. 7 illustrates another screen capture 701 of a portion of the same pivot table, with two different instantiations of an example small display 705, and 706. Screen capture 701 is for illustrating that an option to freeze a view of both row and column dimensions can be selected, which in this case causes columns A-G to be frozen (collectively identified as 710), and as can be discerned by observing that after column G, the next column displayed is column AD. Unfrozen columns displayed are identified as 711. However, even with freezing these columns, on a small display, little context for the data that is currently displayed on the display is evident, as shown by the examples 705 and 706. For example, it would be difficult to discern what territory the value at Column G, row 7 was for. In a larger pivot table, all of the above behaviors would become even more problematic for viewing such information on a small display, such as that of a smart phone.

SUMMARY OF THE INVENTION

Aspects include a method of providing an interface for data displayed on a mobile device. The display has a periphery with first, second, third, and fourth edges, where the first and third edges parallel, and the second and fourth edges parallel. The interface is for interfacing with data comprising field data associated with a first set of dimensions having a traversal order beginning from a root dimension, through one or more subsequent dimensions, to a final dimension. Each dimension of the first set of dimensions has a respective plurality of values. The data also comprises a second set of dimensions having a traversal order beginning from a root dimension, through one or more subsequent dimensions, to a final dimension, where each dimension of the second set of dimensions also has a respective plurality of values.

The method comprises setting a vertical controlling dimension as the root dimension of the first set and a horizontal controlling dimension as the root dimension of the second set. The method also comprises causing display of values of the vertical controlling dimension in a first column along the first edge, display of values of the horizontal controlling dimension in a first row along the second edge, and a matrix of cells locatable by intersections between values of the first column and values of the first row. Each cell is populated based on a respective aggregation of the field data determined by the values locating that cell.

The method also comprises accepting user input indicative of selection of any displayed value. If the user input is indicative of selection of a displayed value from the vertical controlling dimension, then the method includes displaying only that selected value of the values of the vertical controlling dimension in a second column between the periphery of the display and the first column, updating the vertical controlling dimension to a subsequent dimension of the first set, and repeating the causing with the updated vertical controlling dimension.

If the user input is indicative of selection of a displayed value from the horizontal controlling dimension, then the method comprises displaying only that selected value of the values of the horizontal controlling dimension in a second row between the periphery of the display and the first row, updating the horizontal controlling dimension to a subsequent dimension of the second set, and repeating the causing with the updated horizontal controlling dimension.

Another aspect includes a computer readable medium storing computer readable instructions for implementing a method of providing an interface for data displayed on a display. The interface is for interfacing with data comprising field data associated with a first set of dimensions having a traversal order beginning from a root dimension, through one or more subsequent dimensions, to a final dimension. Each dimension of the first set of dimensions has a respective dimension identifier and a plurality of values. There also is a second set of dimensions having a traversal order beginning from a root dimension, through one or more subsequent dimensions, to a final dimension. Each dimension of the second set of dimensions has a respective dimension identifier and a plurality of values. The method comprises setting a controlling vertical dimension as the root dimension of the first set of dimensions and setting a controlling horizontal dimension as the root dimension of the second set of dimensions.

The method also comprises causing display of values of the vertical controlling dimension in a vertical controlling dimension column along the first edge, display of values of the horizontal controlling dimension in a horizontal controlling dimension row along the second edge, and a matrix of cells locatable by intersections between values of the vertical controlling dimension column and values of the horizontal controlling dimension row, each cell populated based on a respective aggregation of the field data determined by the values locating that cell.

The method further comprises detecting a selection by a user of any displayed value. If the selected value is from the vertical controlling dimension, then assigning the controlling vertical dimension as a previous controlling vertical dimension, assigning a subsequent intermediate dimension of the first set as the controlling vertical dimension, displaying values of the controlling vertical dimension in the vertical controlling dimension column, displaying the identifier for the previous controlling vertical dimension in a vertical dimension navigation tab, and updating the array locations to display an aggregation of the field data based on the updated values of the controlling vertical dimension.

If the selected value is from the horizontal controlling dimension, then assigning the controlling horizontal dimension as a previous controlling horizontal dimension, assigning a subsequent intermediate dimension of the second set as the controlling horizontal dimension, displaying values of the controlling horizontal dimension in the horizontal controlling dimension row, displaying the identifier for the previous controlling horizontal dimension in a horizontal dimension navigation tab, and updating the array locations to display an aggregation of the field data based on the updated values of the controlling horizontal dimension; and continuing with the detecting.

Variations on the above subject matter are present other aspects, as well as implementations embodied in computer readable media, and in mobile device systems, and the like. Other features and advantages of the invention will be apparent to persons skilled in the art from the following detailed description of embodiments thereof in conjunction with the appended drawings.

BRIEF DESCRIPTION OF THE DRAWINGS

The following detailed description makes reference to the following figures.

FIGS. 1-7 provide background to aspects of FIGS. 8-34; these figures are described in more detail below.

FIG. 1 provides an example of a portion of a spreadsheet of tabular data;

FIG. 2A is an example of a portion of a pivot table based on the spreadsheet of FIG. 1;

FIG. 2B illustrates an aspect of selecting data displayed in the pivot table;

FIG. 3 illustrates a hypothetical small display imposed over a view of the pivot table;

FIG. 4 illustrates the hypothetical small display imposed over another view of the pivot table;

FIGS. 5 and 6 illustrates other aspects of the pivot table;

FIG. 7 illustrates further aspects of the pivot table, as well as overlays of the small display;

FIG. 22 relates to a horizontal flipping method;

FIGS. 23-26 relate to examples referred to with respect to FIG. 22;

FIGS. 28-33 are used in description relating to FIG. 27; and

FIG. 34 illustrates an alternative format approach to aspects described with respect to the above figures.

DETAILED DESCRIPTION

The following description is presented to enable any person skilled in the art to make and use a method and apparatus to navigate a document, in accordance with embodiments of the invention, and is provided in the context of particular applications and their requirements. Various modifications will be readily apparent to those skilled in the art based on the disclosures here, and principles defined herein may be applied to other embodiments and applications without departing from the spirit and scope of the invention. Moreover, in the following description, numerous details are set forth for the purpose of explanation. However, one of ordinary skill in the art will realize from these disclosures that the invention might be practiced without the use of these specific details. In other instances, well-known structures and processes are shown in block diagram form in order not to obscure the description of the invention with unnecessary detail. Thus, the present invention is not intended to be limited to the examples shown, but is to be accorded the widest scope consistent with the claims appended hereto.

The Background provided examples of some challenges arising from attempting to use pivot tables on a small display device. However, it also would be desirable to allow users familiar with pivot tables and other database programs to continue to use well-known interfaces for creating pivot tables, rather than asking users to learn a different interface. Thus, it is desirable to provide an intermediate layer that can be used by a user when that user wants to access a pivot table on a small display device.

Various examples here will be provided in the context of a possible shape of a display for a small device, such as a smart phone. However, it is to be understood that the disclosures herein are not limited to a particular form factor display, nor to displays for mobile devices, or particular types of mobile devices. Rather, the disclosures herein are applicable to any situation where an amount of data (i.e., data field entries) sought to be displayed are not conveniently shown within a display of a given size.

Also, even though user input may be described as receiving "click" information, or the like, it also is to be understood that user inputs can come from any of a variety of sources, including touch screen inputs, mouse inputs, voice commands, keyboard commands, shortcuts, and the like.

Figure 8:
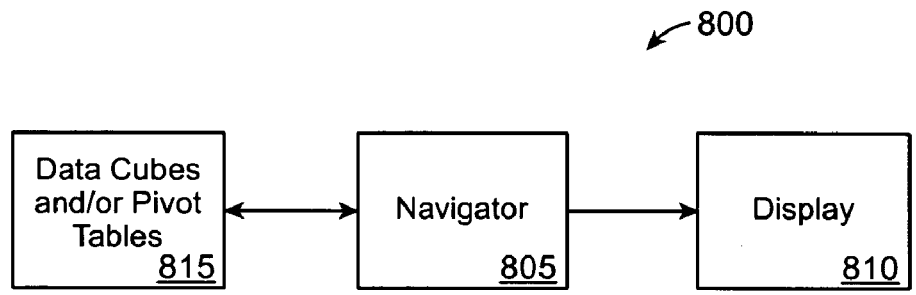
FIG. 8 illustrates an architecture for an aid to navigating and viewing data from such a pivot table.

FIG. 8 illustrates an architecture 800 wherein an intermediate Navigator 805 can be interposed between a display 810 and a source of data 815 that will be displayed, in various aggregations on display 810. The source of data 815 can include any kind of data cube program, such as implementations that can use OLAP databases and provide data cube reports, or pivot tables.

Figure 9:
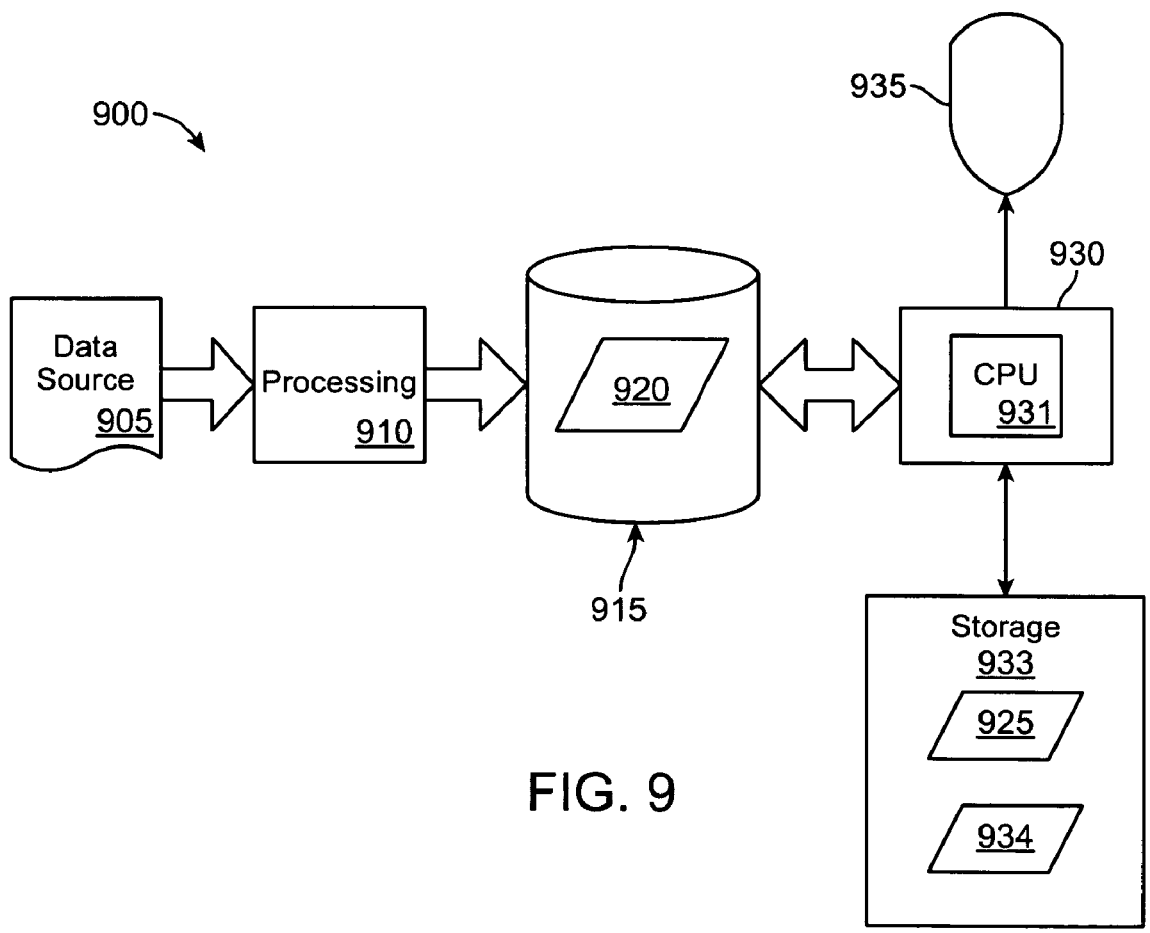
FIG. 9 illustrates other aspects of the architecture.

FIG. 9 illustrates aspects of a system 900 for implementing accessibility of data cubes and pivot tables on mobile devices. System 900 includes a data source 905, which can include any kind of pivot table, or any other source of data comprising tabular data values organized according to at least two different sets of dimensions, such that different summarizations can be achieved through selection of values in each of the sets of dimensions, i.e., a data cube. Data for a given data cube is processed by processing 910 and stored, and/or made accessible by a server 915 having access to a storage facility for storing output from the processing 910. Server 915 communicates with mobile device 930, by for example wireless or wired networks, a direct cable synchronization, Bluetooth, transferring data files by physical media, and the like. Device 930 includes a CPU 931 for executing computer readable instructions made available to it, and which may implement aspects disclosed herein. Device 930 also includes a display 935 that can be implemented using LCD, OLED, plasma, CRT, and other display technologies.

Processing of the data cube or pivot table information can include reading the information and tagging portions of the information with metadata that allow identification and interpretation of the data. For example, subtotal data can be read and tagged as such. Then, the metadata and the values associated with the tags can be stored, along with the underlying data in a file.

Depending on the implementation, some portion or all of data 920 can be stored on mobile device 930, as represented by data 925 stored in storage 933 accessible by device 930. For example, it may generally be more convenient to download the entirety of data 920 to the mobile device to allow lower latency access to such data. Storage 933 also can include storage of other data, such as data for an operating system, and also for storage of computer readable instructions for implementing methods according to any of the example displays and methods provided herein. Storage 933 preferably includes at least some non-volatile memory, and can include solid state memory such as flash memory, as well as hard disk memory. Storage also can encompass any other type of memory technology that may be used, such as ferromagnetic memory, phase change memories, rewritable optical memories, and so on It is desirable to allow users to create pivot tables and otherwise specify data cubes with tools that they already understand. Therefore, translation mechanisms can be provided to take a natively-formatted data cube or pivot table and convert that native format into a format for usage here. Alternatively, but not preferably, examples provided herein also can use the data in a native format.

By example of pivot tables, a pivot table can be specified in a format comprising data and metadata that describes how the data should be arranged. For example, a specification of the pivot table of FIG. 2A would include metadata for specifying the dimensions arranged along the vertical (values occupying rows) and horizontal axes (values occupying columns). In other words, the metadata specifies that Region is a first dimension, followed by Territory, and so on. Other data included in the specification are the values for the dimensions, and summarizations for each combination of values along the different axes (e.g., a total for the Year 2008 in the Americas region, of which there also would be a total for each Territory in the Americas region for the Year 2008, which collectively sum to the total for the whole Region).

In this example, such metadata can be used to create a tree for the respective values of each dimension in each of the two sets of dimensions present in the pivot table, such that relationships between different dimensions of a set, and hence values of each dimension are easily determined.

Interaction Method

Figure 10:
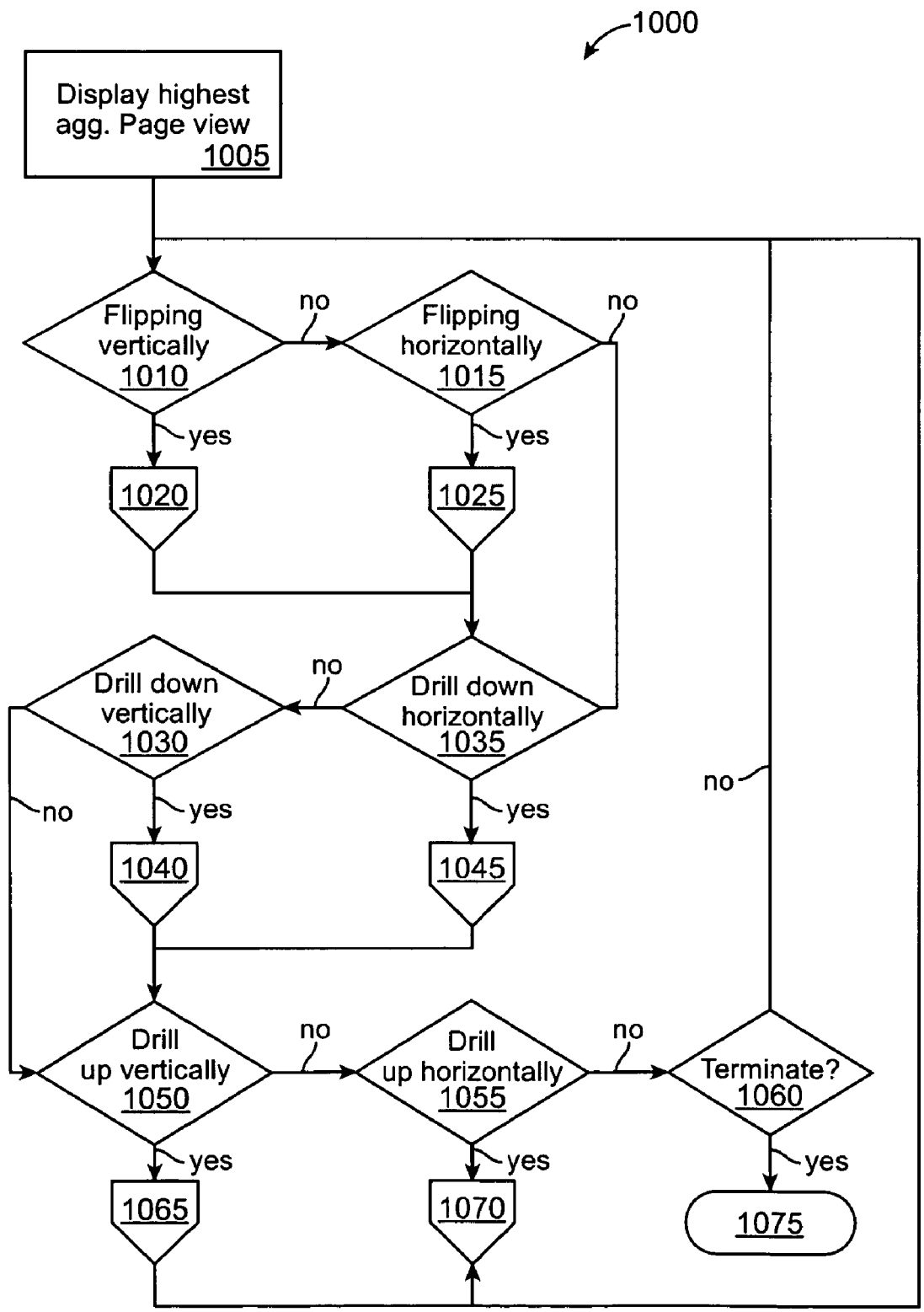
FIG. 10 illustrates aspects of a first method, portions of which are described in detail with respect to later figures.
Figures 11, 12, 13:
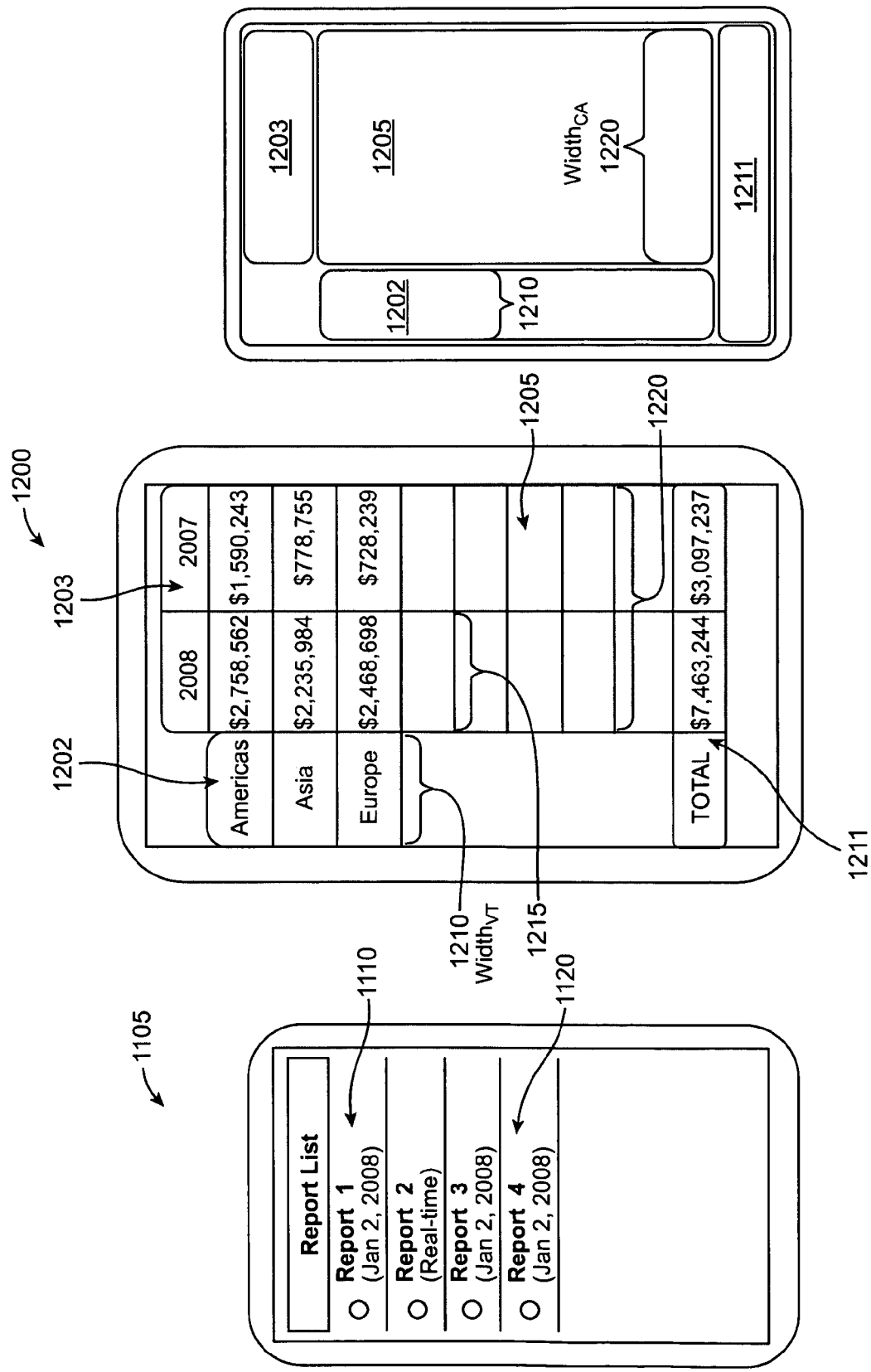
FIGS. 11-13 relate to display content, described in the specification.

FIG. 10 illustrates high-level aspects of a method 1000 for implementing a user interface that allows easier access to pivot table data. For clarity of explanation, various component portions of method 1000 are introduced here, but explained in more detail separately in the following paragraphs and in further figures. Method 1000 begins with displaying, for a selected report, a highest level of aggregation page view (FIG. 12). Once this view is displayed, a user can begin interacting with the view, through any form of input available (e.g., touch screen, mouse, stylus, voice commands, etc.) Thus, method 1000 includes a variety of decision points that represent differentiating between different inputs that can be received from a user for working with the view presented. This method is presented as a cyclic iteration among these different decision points, but as can be perceived from this example, any of a variety of other arrangements of the components of this method can be provided, as well as a variety of interconnections between them. Thus, method 1000 illustrates consideration of types of input to be differentiated, while further disclosure shows how the input affects the views displayed, such that other arrangements accomplishing these view effects would be apparent therefrom.

First, within the view presented, a user can flip either vertically or horizontally, and so, vertically flipping is detected at step 1010, and horizontal flipping is detected at step 1015. If vertical flipping (1010) is detected, then method 1000 proceeds to 1020 (FIGS. 17-21), for updating the view, and if horizontal flipping (1015) is detected, then method 1000 proceeds to 1025 (FIGS. 22-26) for updating the view accordingly. When the view has been updated for either flipping, then 1020 and 1025 return to detect whether the user has provided input for horizontal drill down (1035), and if so then the view is updated at 1045 (FIGS. 27-31). If there is no horizontal drill down, then vertical drill down input is detectable (1030), and if detected then the view is updated with 1040 (FIGS. 27-33). Upon return from 1040 or 1045, or by not detecting either drill down input, then drill up vertical input is detectable (1050) and if detected then 1065 updates the view displayed accordingly. If no vertical drill up input is detected, then horizontal drill up is detectable (1055), and if detected then 1070 updates the view displayed.

Returning from either 1065 or 1070, method 1000 goes to the beginning of input classification (flipping 1010) for further inputs, or further classification of existing inputs. Method 1000 can terminate 1060 by detecting user input to close the navigation function, and if no such input is detected, then the method returns to classifying/detecting vertical flipping input 1010.

As would be appreciated, method 1000 thus illustrates an example of how an input can be classified. Various other classification routines for these classifications would be evident. For example, after returning from view updates, a local loop can be provided for further input detection/classification (e.g., a local loop can be provided such that returning from 1020 would again detect vertical flipping at 1010.) In FIG. 10, a separate identifier link is provided for processing of each type of input, but in the following description some of the concepts are treated with respect to others, and whether or not certain of the processing shown in FIG. 10 is handled distinctly or together is a matter of implementation.

Overview of Display

FIG. 11 illustrates an example display 1105 populated with a report list, which can include identifying titles for the reports, e.g., title 1110, as well as an indication when such report was created (e.g., date 1120), or alternatively, whether the report is synchronized with a data source (e.g., data source 905).

FIG. 12 illustrates a highest level of aggregation view 1200 based on the same data (FIG. 1) as the pivot table background information of FIGS. 2-7, aspects of which are described below. First, a vertically oriented tab column 1202 (a.k.a. a tab field) having one or more values for at least one highest level dimension is displayed along a first edge of the example view 1200. Referencing FIG. 2A, the highest level row-based dimension of that pivot table is Region, and it has values "Americas", "Asia", and "Europe", which are the values appearing in the tab column 1202, each value of which is a separately distinguishable entry (i.e., selection of Americas can be distinguished by the system from selection of Asia, as will be addressed below). Column 1202 has a width 1210 (also referred to as Width$_{VT}$).

A horizontally-oriented tab row 1203 appears along a second edge of view 1200 (in this example, along a top horizontal portion). Tab row 1203 displays values for a highest-level column-based dimension of a data cube input (e.g., a pivot table). Referencing again FIG. 2A, a highest-level dimension forming columns in that pivot table is Year, and it includes values 2006, 2007, and 2008. As evident from view 1200, not all of these dimensions are displayed, in that the amount of room is insufficient to do so, and aspects of view space allocation are addressed below. In particular, a width 1220 of view 1200 allocatable to columns is defined, and a width of a first column 1215 also is identified in FIG. 12.

As is evident from FIG. 12, entries summarizing the tabular data from the raw spreadsheet (partially shown in FIG. 1) are provided at intersections between rows and columns in view 1200. For example, at the intersection between Americas and 2008, a sum of sales for 2008 in the Americas region is presented.

A further aspect of view 1200 is that a horizontally arranged totals field 1211 is presented at a fourth edge of view 1200, opposite the second edge (in this example, proximate a bottom of view 1200). The totals field 1211 would have space available to display a total of the row entries displayed for each column displayed. For example, the total for all values of the dimension Region in 2008 is shown. Totals field 1211 provides a predictable and always viewable location for such information. By contrast, a pivot table such as that of FIG. 2A presents such information in a row at the end of the pivot table, which can vary based on the granularity of the view currently shown (e.g., the view of FIG. 2A would have such a total in a row different from the view of the same pivot table shown in FIG. 4 (row 23 in FIG. 2A versus row 31 in FIG. 4). For a smaller display, such total information may thus be visible at some times and would require scrolling at other times to view. Of course, in conventional pivot tables, when scrolling through a page of data searching for a particular value or total, or the like, other data previously displayed would disappear, causing the context provided by such data to be lost.

FIG. 13 shows an outline 1300 of view 1200 with the fields identified above. As is evident, a total width of the display is approximately divided between the width of devoted to data columns (1220) and the width (1210) devoted to the vertically oriented tab field 1202. Likewise, a height of the display is generally divided among field 1203, field 1205, and totals field 1211. Depending on particulars of any given case, including aspects of what information is available from a given data source and what kind of display is available, it may be desirable to orient the pivot table such that a smaller dimension of the display is used for the vertically oriented tab field (1202) and a longer dimension is used for the horizontally oriented tab field (1203). Logic can be provided to select an orientation, and a user also may be provided the ability to select an orientation. Therefore, the terms horizontal and vertical are not used in an absolute sense, but rather for providing terminology useful in describing the examples presented.

Display Formatting

Figure 14:
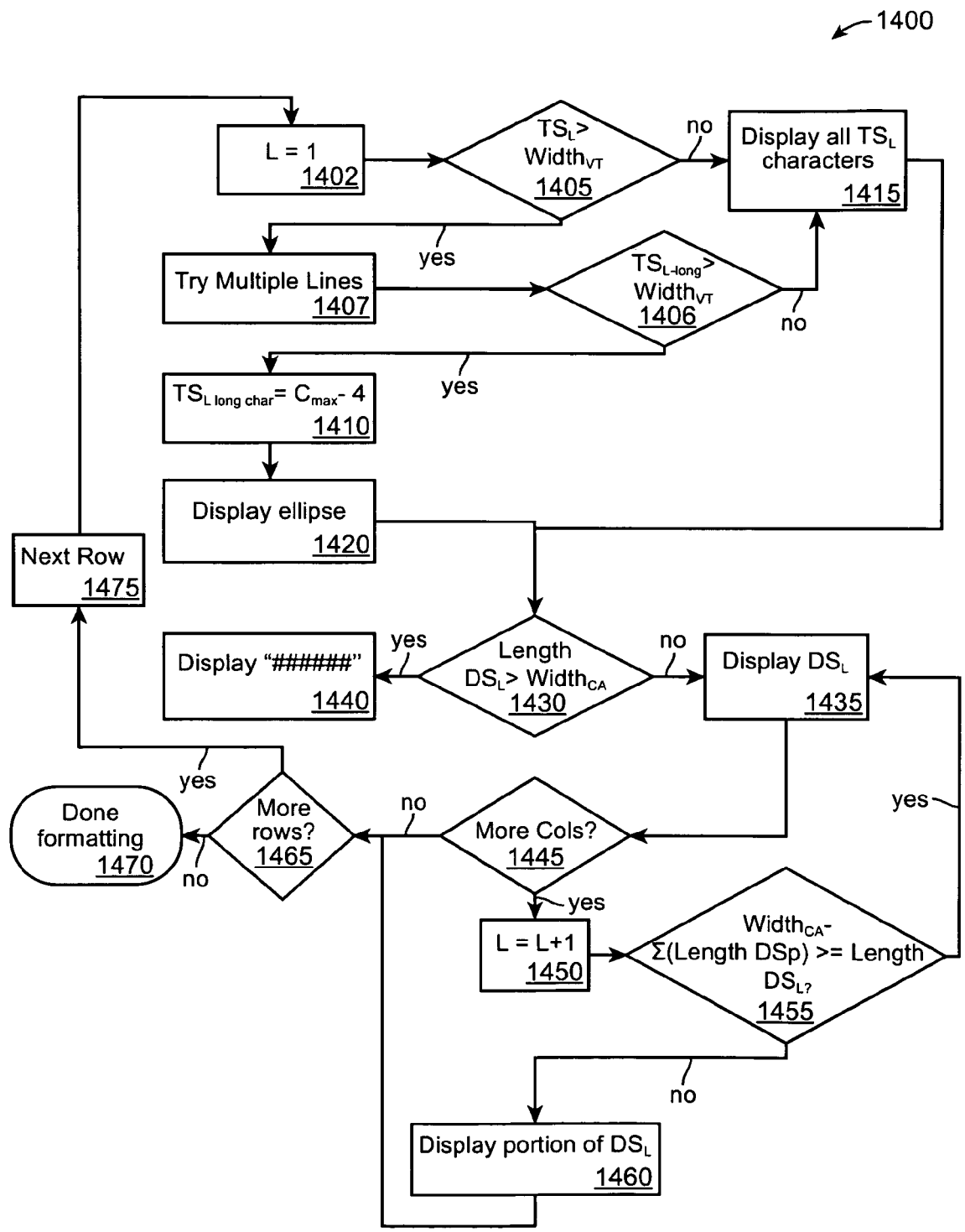
FIG. 14 relates to a method of formatting a display.
Figure 15:
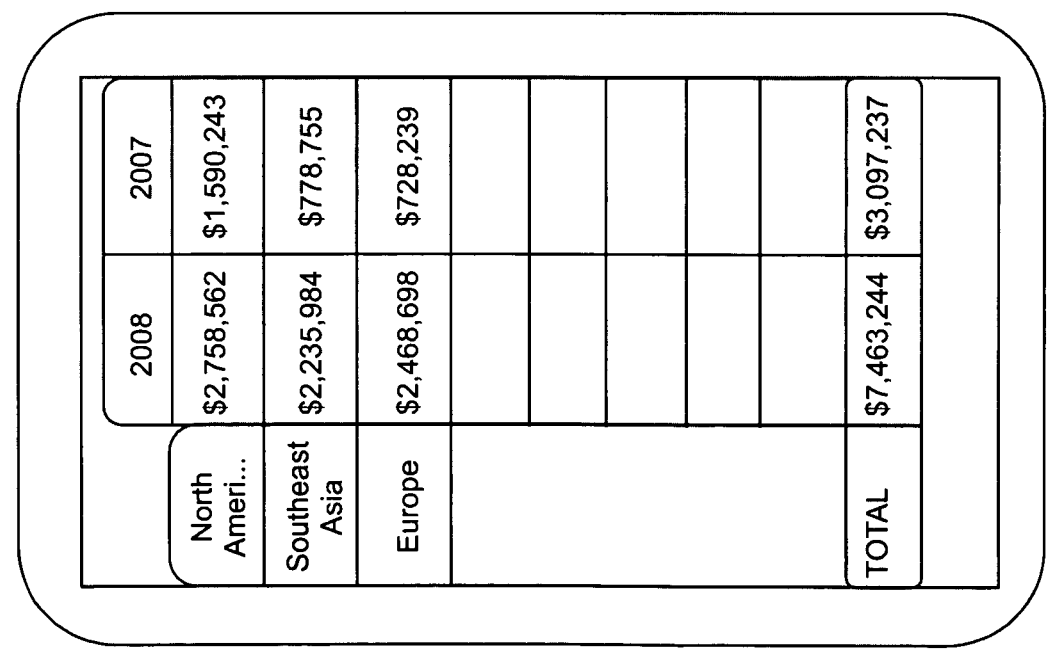

FIG. 14 illustrates a method 1400 providing an example implementation accounting for some aspects of how screen space can be allocated among the fields identified in FIGS. 12 and 13. Method 1400 includes setting reference number L to 1, and then examining the first entry of the vertically oriented tab field 1202, identified as Text String L (TS$_L$). If all the characters of TS$_L$ collectively are equal to or shorter than the width 1210 (Width$_{VT}$), then all characters can be displayed, e.g., "Europe" in FIG. 15 is shorter than Width$_{VT}$ and all characters are displayed.

However, if length of TS$_L$ is greater, then method 1400 determines whether TS$_L$ has multiple words, or otherwise allows splitting or a reasonable hyphenation (1407). If so, then TS$_L$ is split among two different lines. For example, "Southeast Asia" can be split such that "Southeast" is provided on one line and "Asia" on a following line. In an embodiment, when one entry in the vertically oriented tab field is split to two lines, all tab entries can be increased to two lines of space, even though not all such tab entries may require two lines of space.

Then, for the longest line, it is also determined whether the characters of TS$_L$ on that line are longer than Width$_{VT}$ (1406), and if so then, C$_{max}$ can be displayed on that line, and 4 fewer than C$_{max}$ characters of TS$_L$ are displayed (1410), followed by an ellipse (1420) (i.e., in this example, there is space allocated for display of the ellipse " . . . " if there is not enough space to show the entire text entry). The first tab field of FIG. 15 provides an example of this, with "North Ameri . . . " being displayed for a TS$_L$ "North America".

Then, columns of field 1205 are considered. A priority of method 1400 is to fully display the numbers of at least one column, so at 1430 it is determined whether the length of Data String L (DS$_L$) is greater than the width of the entire data field 1205 (Width$_{CA}$), and if so, then DS$_L$ cannot be fully displayed in field 1205, and a "####" entry is displayed instead 1440. Otherwise, DS$_L$ is displayed (1435).

Then, it is determined (1445) whether there are more columns in the row under consideration, and if so, then L is incremented (1450) and then at 1455 it is determined whether the remaining width of field 1205 can display the entirety of DS$_L$ (e.g., for L=2, DS$_L$ is $1,590,243 in FIG. 15).

This remaining width can be defined by $$Width_{CA} - \overset{L-1}{\underset{p=1}{a}} LengthofDS_p.$$

Figure 16:
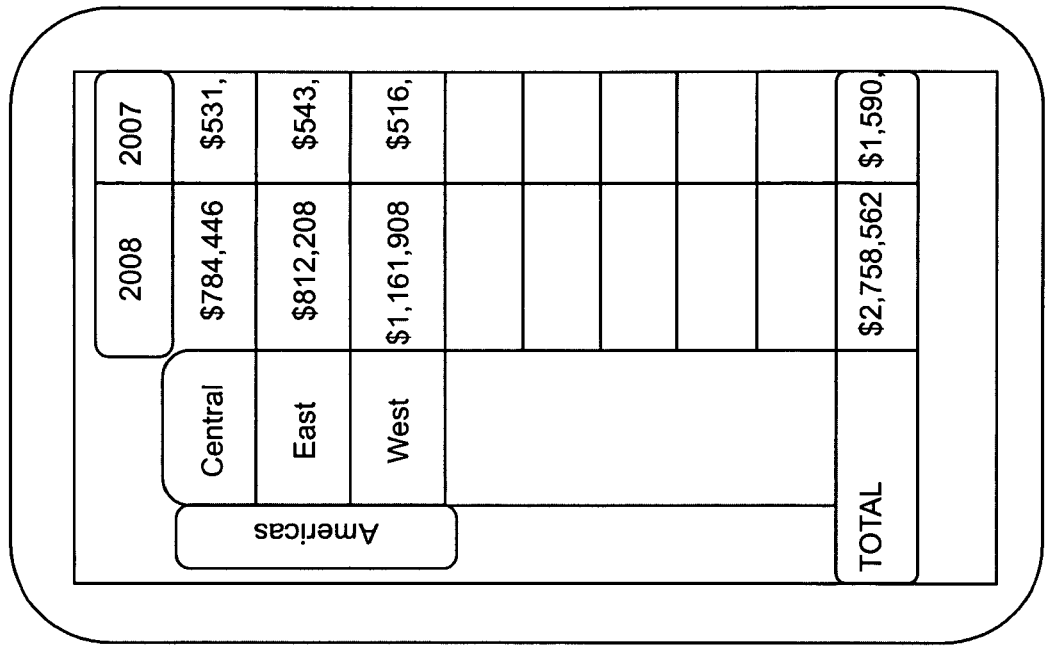
FIGS. 15-16 relate to examples referred to with respect to FIG. 14.

If such remaining width is greater than length of DS$_L$, then the entire string can be displayed (1435), and if not then a portion of DS$_L$ that can be displayed is displayed. FIG. 16 provides an example where only a portion of strings under the 2007 column can be displayed. The same procedure can be applied in total field 1211.

Then, method 1400, after 1460 returns to determine whether there are more columns 1445, and if not then it is determined whether there are more rows 1465, if so, then the next row is examined 1475, and if not then method 1400 can terminate 1470.

For further rows, step 1455 of method 1400 would operate by using the longest data string in a particular column for determining whether the remaining width of field 1205 is enough to display a given data string under consideration. For each row, step 1405 may cause the width of the first column to increase from what was set by a previous row, such that the longest data string determines the width of the first column, and of subsequent columns.

It also is to be noted that method 1400 usually would be executed each time another navigation procedure is undertaken. For example, after drill down/drill up either vertically or horizontally, method 1400 would be used to organize the display.

Figures 17, 18:
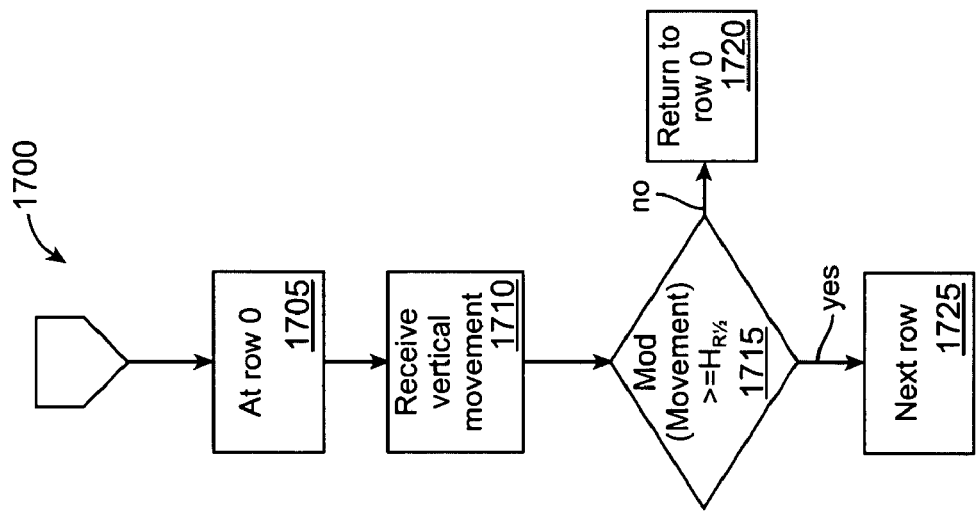
FIG. 17 relates to a vertical flipping method.
FIGS. 18-21 relate to examples referred to with respect to FIG. 17.

FIG. 17 is for illustrating an example method 1700 of flipping vertically in response to user input to update a display as shown in accompanying FIGS. 18-21. method 1700 begins with a display being at row 0, meaning that a first row displayed is called row 0, as illustrated by example in FIG. 18 with the row of area 1 being row 0. A vertical movement indication is received 1710, and an amount of movement indicated is quantified and divided modulo by a row height. The remainder of that division is compared with one half of the row height $H_{R1/2}$. If that remainder amount of movement was greater than one half of the row height, then the next row is displayed (1725), and if it is not then row 0 continues to be displayed (1720). In other words, the display can be allowed to move in response to user input, but if the input is not enough to be more than half of a row height, then the display can return to displaying the same set of rows. Or, any number of rows can be flipped through, but the final step is to determine whether any amount in excess of a row height is enough to flip to the next row or return to the previous, such that no stopping in the middle of two rows is permitted.

Figure 20:
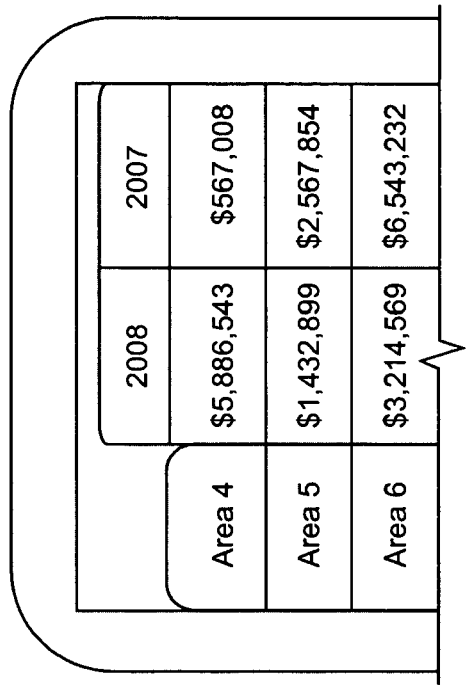
Figure 21:
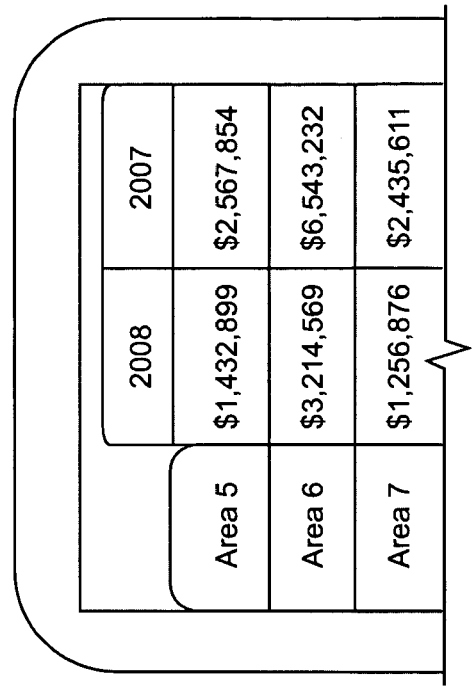
Figure 19:
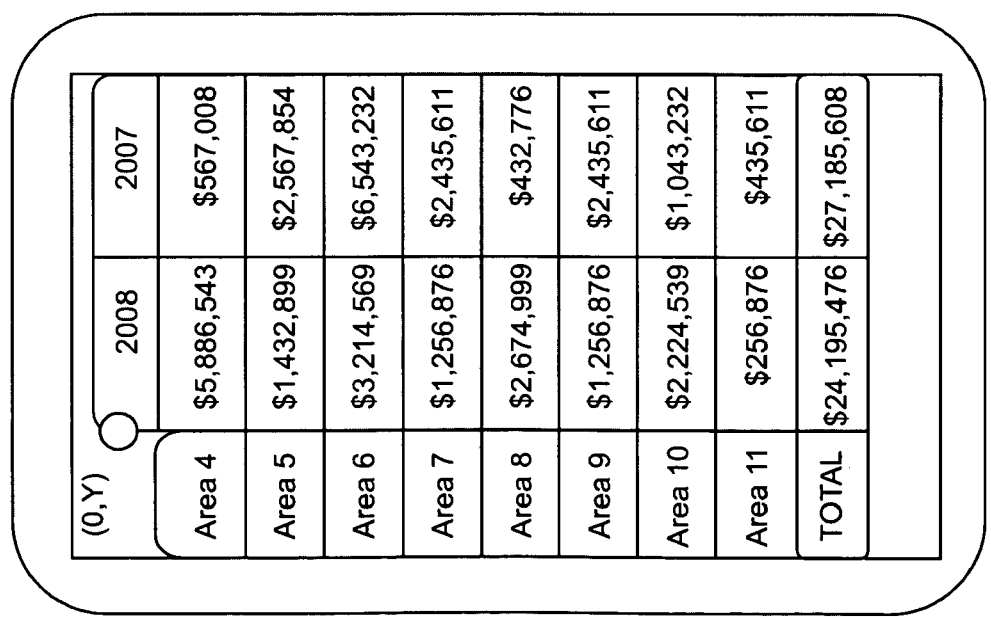

FIG. 19 illustrates an example where a vertical movement was received and quantified that row 0 has moved from (0,0) to (0,Y), such that if Y>½ the row height, then the row 0 display is shown in FIG. 21, wherein the row of area 5 now is row 0. FIG. 20 shows the converse, wherein area 4 remains row 0, which is the result if the vertical movement received is less than half of the row height. The row height of row 0 can be used, if row heights are not all equal. If the movement is precisely half, then it can be the case that either that the row will flip or not (i.e., a tie can be resolved either way).

Figures 22, 23:
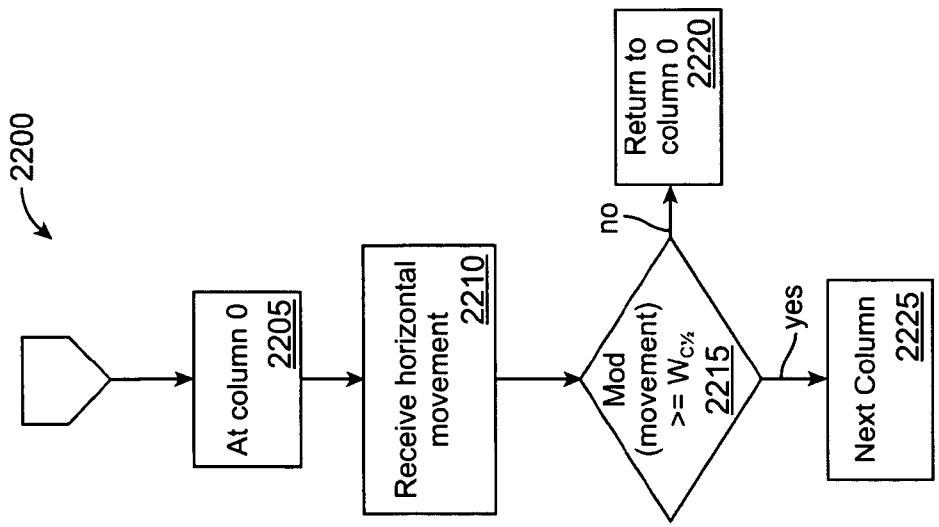

FIG. 22 illustrates an example horizontal flipping method 2200. Method 2200 starts begins with column 0 as illustrated in FIG. 23, meaning that a reference point can be identified as (0.0). Then, a horizontal movement is received (2210), as shown by the display of FIG. 24, which shows the point (0.0) having moved to the left, such that part of column 0 is obscured. Then, it is determined (2215) whether the movement is less than one half of the width of column 0. If so, then the view flips back (see FIG. 26), and if not then the next column becomes the first column displayed (see FIG. 25). As with the vertical flipping, full column amounts of flipping cause full columns to flip, while whether an amount remaining of any movement being more or less than half of a given column width (the then column 0) determines whether or not another column will flip.

"Drill Down"

Figure 27:
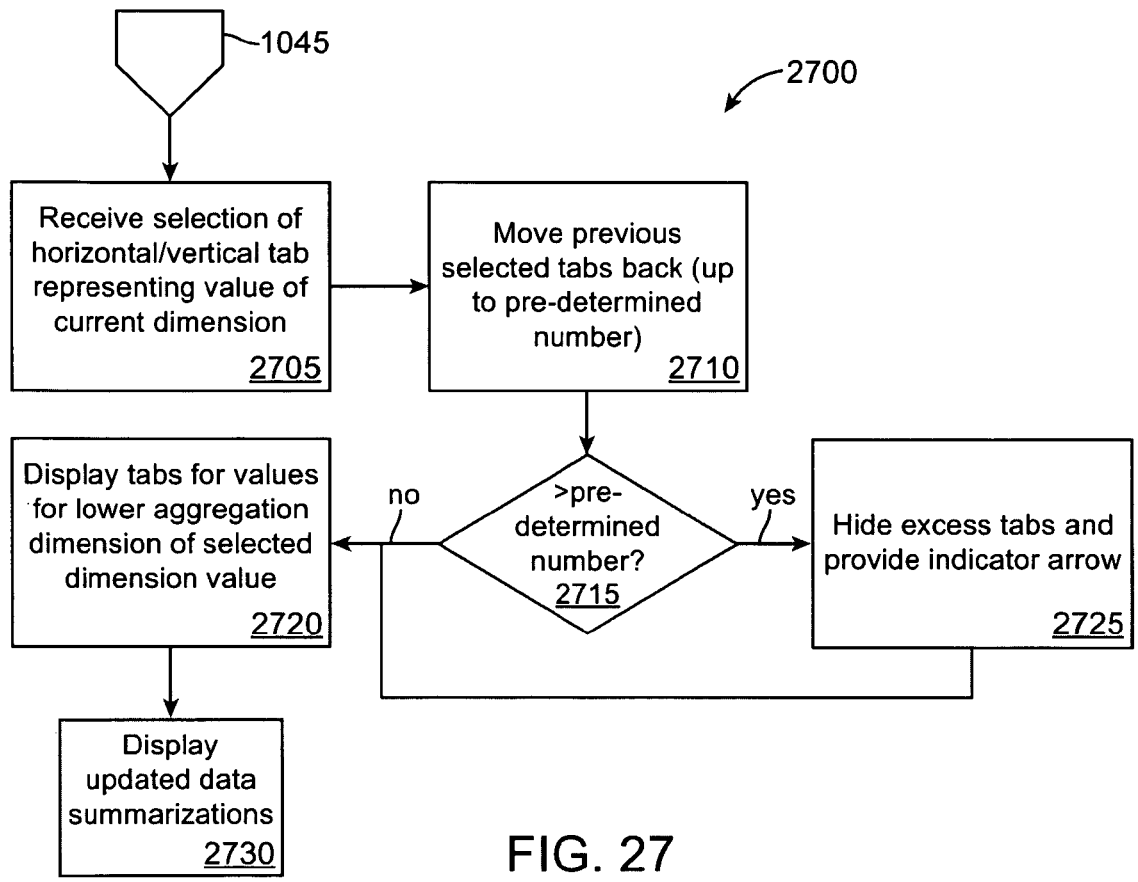
FIG. 27 relates to drill up/drill down methods.

FIG. 27 illustrates a method 2700 for navigation using the user interface shown in previous figures. For clarity, one method is explained in more detail for both horizontal tab and vertical tab drill down, as the steps are similar, but the horizontal drill down is first shown and described, followed by further figures relating to the vertical tab drill down.

Method 2700 is entered at step 1045 (FIG. 10), and begins with receiving (or otherwise, identifying) a selection of a horizontal tab or a vertical tab (examples to horizontal) that represents (displays) a value of a current dimension arrayed along the horizontally oriented tab field display (see 1203 of FIGS. 12 and 13). In these examples, "horizontal tab" drill down describes exposing more granular levels of tabs presented along a horizontal axis (see FIG. 12, 1203) and "vertical tab" drill down describes exposing more granular levels of tabs presented along a vertical axis (see FIG. 12, 1202).

In response, a previous configuration of tabs is rearranged such that tabs previously displayed are moved back (2710), and if more than an allowable number of tabs, including tabs for the new values to be displayed are too great (determination in 2715), then those excess tabs are hidden, and an indicator arrow is provided (2725) to their existence. In either case, new tabs representative of values for the dimension relating to the value of the tab selected are shown (2720), and the data displayed in field 1205 is updated based on the new values presented.

Figure 28:
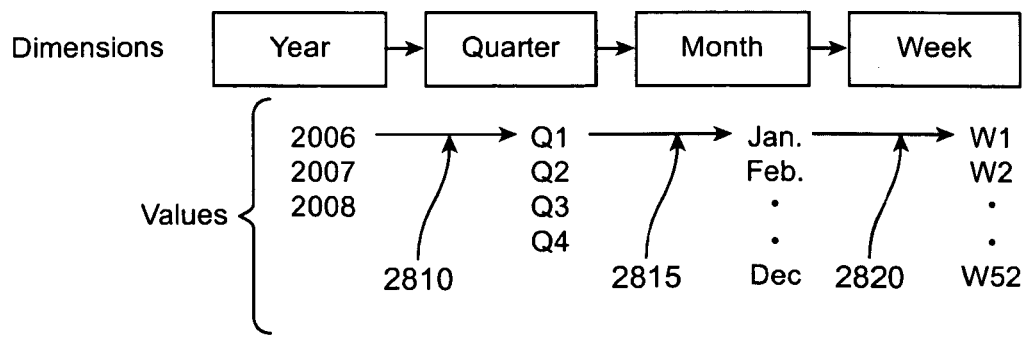

FIGS. 28-31 provide an example of horizontal tab drill down. FIG. 12 serves as a starting point, where a highest level dimension (Year) has its values displayed (2006 and 2007) are visible in FIG. 12, and 2008 would be visible if horizontal flipping (see FIG. 22) were used to expose that value. Thus, the values of the Year dimension are displayed as tabs in field 1203. FIG. 28 shows an interrelationship between the Dimensions related to the horizontal tab field (i.e., the pivot table was designed to display these dimensions as column-oriented data; see FIG. 2A). As evident from FIG. 28, Quarter is the dimension hierarchically more specific to the Year dimension, Month is the hierarchically more specific dimension to Quarter, and Week is the dimension for Month. Each of these dimensions has respective values (e.g., Quarter has values Q1 . . . Q4, and so on).

Then assuming that the horizontal drill down input received was a selection of the Tab for 2008 (e.g., flipping to expose 2008, then selecting that tab), method 2700 first responds by moving the 2008 tab back from the field 1205, and hiding (no longer displaying) any tab relating to other values of the Year dimension, as shown in FIG. 29. Then, method 2700 causes display of the next dimension (Quarter) in tabs controlling the contents of field 1205 (FIG. 29).

In other words, Year has 3 values, and when Year is the active dimension (i.e., the dimension whose values control the content of field 1205, all of the values for the Year dimension can be exposed by flipping within one page. When one of those values is selected for drill down, the other values are then hidden, such that flipping would not expose data relating to years other than 2008. This is by contrast with pivot tables, where increasing granularity of data for one year causes the other data to be pushed somewhere else on the same page, and to view it, one must scroll to find it and view it.

Thus, after that selection of 2008 (2810 of FIG. 28), method 2700 would cause the intersections between the rows and columns of field 1205 to be updated to represent data summarizations reflecting the same Region values, but specifically for the Quarter dimension values of 2008. The totals of totals field 1211 also would be updated.

FIG. 30 illustrates that the process can continue by selection of one of the Quarter dimension values; here, Q1 is selected (2815 of FIG. 28). Then, the values of the next dimension (dimension=Month, and values January . . . December) are displayed, and method 2700 again updates the data field 1205 and totals field 1211. FIG. 31 illustrates that when the January value is selected (2820 of FIG. 28), such that the next dimension (Week) values are presented, that the 2008 tab is hidden (no longer displayed), such that only 3 levels of tabs are shown, and an indicator arrow is provided for indication that further higher dimensions are available. Instead of or in addition to a number, an amount of screen space devoted to the horizontally oriented column tabs also can control how many tabs are displayed at a given time. If desired, abbreviations, or ellipses can be used to shorten value identifiers. Collectively, the transitions between values of different dimensions (e.g., 2810, 2815, and 2820) can be called a navigation path, in that the values selected during such navigation represent how a user navigated to a present view. Since there are multiple sets of dimensions in use, there can be a navigation path for each set of dimensions.

FIGS. 32 and 33 illustrate views of drilling down for the vertical tabs, which proceeds similarly to the horizontal tab drill down explained above. In these examples, a smaller column of tabs having values oriented along the first edge can be provided, such that multiple values for multiple previous dimensions are presented along that first edge, as shown in FIG. 33. This configuration uses less screen space than causing a separate column for each value tab for each previous dimension. This tab orientation also can be employed in the horizontal tabs, if desired. As can be observed, the data summarizations are updated to reflect the controlling dimension (e.g., FIG. 32 shows that the summarizations are for each territory value within the Americas region, and FIG. 33 shows that summarizations are for the Corporate/Retail values of the Business Type dimension, within the Central territory of the Americas region).

"Drill up"

Similarly, once there has been at least one dimension more granular than the most general dimension for either the horizontally or vertically oriented tab fields, then a "drilling up" operation can be conducted in response to selection of a less granular/less specific tab. Referencing FIGS. 29-31, in the sense that the Year dimension was controlling (i.e., controlled the field data summarizations), the Year dimension can be called a previous dimension to the Quarter dimension, and similarly both the Year and Quarter dimensions are previous to the Month dimension in FIG. 30.

Thus, in some example implementations, more than one previous dimension can have a value displayed that with other values represent at least a portion of a path through the values of the dimensions. In other words, FIG. 28 shows arrows 2810, 2815, and 2820 that depict a path through the values of the dimensions. These values are displayed in the tab fields (at least up to a maximum number, as described above), so that previous dimensions are presented through the values of those dimensions that were selected.

Therefore, it is provided that for drilling up, a previous dimension can be recalled by clicking on the value of that dimension displayed in its tab field. For example, in FIG. 30, the year 2008 dimension can be clicked such that the display would be returned to that of FIG. 12. Or, the Quarter 1 tab could be selected to return the display to that of FIG. 29. When no previous dimensions remain undisplayed, then the indicator arrows are removed (e.g., returning from FIG. 31 to FIG. 30). The indicator arrow itself also can be made selectable such that the first hidden dimension can be recalled and the value of that dimension which was selected (e.g., in FIG. 31, 2008) would be exposed as the controlling dimension for the data field summarizations.

FIG. 34 illustrates another approach to navigating a display like that of FIG. 12. Instead of maintaining multiple tabs for each set of dimensions along respective horizontal and vertical edges (e.g., FIG. 32, above), Buttons 3405 and 3410 can be provided respectively that display a value corresponding to what was previously selected to arrive at the display, as it presently is. For example, in FIG. 34, Americas was previously selected, such that the controlling dimension is Territory along the vertical tab column (see FIG. 12, 1202), while the horizontal button 3410 displays 2008, which was the value of the Year dimension selected to arrive at the Quarter dimension display currently shown in FIG. 34. Thus, drill down occurs by selecting tabs from the tab fields bordering the field 1205, while drill up occurs by selecting the buttons 3405 and 3410, respectively for vertical tab drill up and horizontal tab drill up.

In sum, the above-described drill-up and drill-down processes allow user selection of horizontal and vertical controlling dimensions, which control aggregations of data values in the data field. For ease of reference, values of a vertical controlling dimension are described, in an example, as being displayed in a vertical controlling dimension column. When there is drill-down, the vertical controlling dimension column is repopulated with values for each subsequent vertical controlling dimension (i.e., as the vertical controlling dimension changes, the column for displaying values of the vertical controlling dimension is repopulated with those values). Similar description applies for the horizontal controlling dimension. Also, one or more prior controlling vertical/horizontal dimensions can be displayed between respective edges of the display and the controlling dimension row/column, such that the controlling row/column is proximate the array (matrix) of data values.

All of the foregoing methods, and constituent steps, decisions, and determinations can be represent examples of implementations of system functions and other computation to display the example user interface screens of the various figures. Aspects of these disclosures are implementable in a variety of ways, and implementations often would rely on preexisting code for providing certain functions, such as drawing tabs, detecting inputs, changing screen displays, providing summation calculations, memory management, and other mathematical functions that may be needed or useful.

In this specification, the terms "computer program medium" and "computer useable medium" are used to generally refer to any media capable of storing information for retrieval by a machine, and interpretable as machine readable instructions. Such instructions, can generally be referred to as "computer program code" (which may be grouped in the form of computer programs or other groupings), when executed, and enable machines to perform features or functions of the present invention as discussed herein.

The foregoing description and drawings of preferred embodiments in accordance with the present invention are merely illustrative of the principles of the invention. Various modifications can be made to the embodiments by those skilled in the art without departing from the spirit and scope of the invention, which is defined in the appended claims.

We claim:

1. A method of providing an interface for displaying field data on a mobile device, the method comprising:
    setting a controlling row dimension as a first dimension of a first set of hierarchical dimensions associated with the field data, each dimension of the first set corresponding to at least one respective value and setting a controlling column dimension as a first dimension of a second set of hierarchical dimensions associated with the field data;
    forming a matrix of cells organized into rows and columns, each of the rows associated with a tab of a current tab column that is populated with a respective value from the controlling column dimension, and each of the columns associated with a tab of a current tab row that is populated with a respective value of a controlling row dimension, an entry corresponding to each cell of the matrix determined by a respective aggregation of the field data determined by the values appearing in the row and column for that cell;

displaying the tab column along a first edge of a display of the mobile device, a periphery of the mobile device having first, second, third, and fourth edges, a width defined between the first and third edges and a height between the second and fourth edges;

displaying the tab row along the second edge of the display;

displaying as many rows and columns of the matrix of cells as can fit within an available width defined by the width of the display subtracting a width of the first tab column, and an available height defined by the height of the display subtracting a height of the tab row;

receiving input indicative of selection of any tab from the tab column;

responsive to the tab selection from the tab column, adding the value corresponding to the selected tab to a first navigation path, displaying in a prior tab column between the first edge and the tab column, a tab for up to a pre-determined number of values in the first navigation path, subtracting a width of the prior tab column from the available width, updating the controlling row dimension to a subsequent dimension of the first set, and repeating steps of forming the matrix, displaying the tab column, displaying the tab row, and displaying the matrix;

receiving input indicative of selection of any tab from the tab row;

responsive to the tab selection from the tab row, adding the value corresponding to the selected tab to a second navigation path, displaying in a prior tab row between the second edge and the tab row, a tab for up to a number of values in the second navigation path, subtracting a height of the prior tab row from the available height, updating the controlling column dimension to a subsequent dimension of the second set, and repeating; and maintaining display of a respective total entry in a respective fixed portion of the display for each column of the matrix displayed, the respective total entry indicative of a total of all entries of cells of the column, regardless whether each such entry is currently displayed.

2. A method for interfacing a user of a device with data, the method comprising:
  on a display of a device with a limited display area, the display having a periphery with first, second, third, and fourth edges, the first and third edges parallel, and the second and fourth edges parallel, causing display of a user interface for presenting summarization results of field data associated with a first set of dimensions having a traversal order beginning from a root dimension, through one or more intermediate dimensions, to a final dimension, each dimension of the first set of dimensions having a respective plurality of values, and a second set of dimensions having a traversal order beginning from a root dimension, through one or more intermediate dimensions, to a final dimension, each dimension of the second set of dimensions having a respective plurality of values, the display comprising:
    a first column of vertical tabs proximate the first edge,
    a first row of horizontal tabs proximate the second edge,
    an array proximate the third edge and the fourth edge comprising locations defined by intersections between each of the vertical tabs and each of the horizontal tabs,
    wherein the first row of horizontal tabs is displayed between the array and the second edge, and the first column of vertical tabs is displayed between the array and the first edge,
    wherein the vertical tabs each display a different value of the root dimension of the first set, and the horizontal tabs each display a different value of the root dimension of the second set, and
    wherein the array locations each display a value representing an aggregation of the field data based on the values displayed by the vertical tabs and the horizontal tabs;
  selecting the root dimension of the first set to be a current vertical dimension, and the root dimension of the second set to be a current horizontal dimension;
  detecting a selection by a user of any of the vertical tabs and the horizontal tabs;
  responsive to detecting tab selection, resolving which tab was selected;
  responsive to the selected tab being a vertical tab,
    ceasing the display of the first vertical column of tabs,
    assigning the current vertical dimension as a previous vertical dimension,
    assigning a subsequent intermediate dimension of the first set as the current vertical dimension,
    displaying the value corresponding to the selected tab in a vertical tab proximate the first edge, without also displaying tabs for other values of the previous vertical dimension,
    displaying values of the current vertical dimension in a second vertical column of tabs proximate the array, and
    updating the array locations to display an aggregation of the field data for the values of the second vertical column of tabs;
  responsive to the selected tab being a horizontal tab,
    ceasing the display of the first horizontal column of tabs,
    assigning the current horizontal dimension as a previous horizontal dimension,
    assigning a subsequent intermediate dimension of the second set as the current horizontal dimension,
    displaying the value corresponding to the selected tab in a horizontal tab proximate the second edge,
    displaying values of the current horizontal dimension in a second horizontal column of tabs proximate the array, and
    updating the array locations to display an aggregation of the field data for the values of the second horizontal column of tabs; and
  continuing with the detecting.

3. A computing device having a limited display area, comprising:
  a display having a periphery with first, second, third, and fourth edges, the first and third edges parallel, and the second and fourth edges parallel, the display sensitive to touch and operable to output information indicative of a location where a touch was detected;
  a computer readable medium storing data comprising field data associated with a first set of dimensions having a traversal order beginning from a root dimension, through one or more intermediate dimensions, to a final dimension, each dimension of the first set of dimensions having a plurality of values, and a second set of dimensions having a traversal order beginning from a root dimension, through one or more intermediate dimensions, to a final dimension, each dimension of the second set of dimensions having a plurality of values;

a computer readable medium storing instructions for causing display of a two-dimensional user interface comprising a first column of vertical tabs proximate the first edge, a first row of horizontal tabs proximate the second edge, an array proximate the third edge and the fourth edge comprising locations defined by intersections between each of the vertical tabs and each of the horizontal tabs, wherein the first row of horizontal tabs is displayed between the array and the second edge, and the first column of vertical tabs is displayed between the array and the first edge, wherein the vertical tabs each display a different value of the root dimension of the first set, and the horizontal tabs each display a different value of the root dimension of the second set, and wherein the array locations each display a value representing an aggregation of the field data based on the values displayed by the vertical tabs and the horizontal tabs;

a computer readable medium storing instructions for selecting the root dimension of the first set to be a current vertical dimension, and the root dimension of the second set to be a current horizontal dimension, interpreting a detected touch, based on the information indicative of the location on the display of the touch, as being a selection of anyone of the vertical tabs and the horizontal tabs, for a vertical selected tab, ceasing the display of the first vertical column of tabs, assigning the current vertical dimension as a previous vertical dimension, assigning a subsequent intermediate dimension of the first set as the current vertical dimension, displaying the value corresponding to the selected tab in a vertical tab proximate the first edge, without also displaying tabs for other values of the previous vertical dimension, displaying values of the current vertical dimension in a second vertical column of tabs proximate the array, and updating the array locations to display an aggregation of the field data for the values of the second vertical column of tabs, for a horizontal selected tab, ceasing the display of the first horizontal column of tabs, assigning the current horizontal dimension as a previous horizontal dimension, assigning a subsequent intermediate dimension of the second set as the current horizontal dimension, displaying the value corresponding to the selected tab in a horizontal tab proximate the second edge, displaying values of the current horizontal dimension in a second horizontal column of tabs proximate the array, and updating the array locations to display an aggregation of the field data for the values of the second horizontal column of tabs;

a display driver for controlling the display; and a processor for implementing the instructions stored on the computer readable media and controlling the display driver.

4. The device of claim 3, wherein the computer readable mediums are implemented as one or more items of media.

5. The device of claim 3, wherein the device is a mobile device.

6. A computer readable medium storing computer readable instructions for implementing a method of providing an interface for data displayed on a display, the method comprising:

setting a controlling vertical dimension as the root dimension of the first set of dimensions, the first set of dimensions having a traversal order beginning from a root dimension, through one or more subsequent dimensions, to a final dimension, each dimension of the first set of dimensions having a plurality of values, the first set of dimensions associated with a field data;

setting a controlling horizontal dimension as the root dimension of the second set of dimensions, the second set of dimensions having a traversal order beginning from a root dimension, through one or more subsequent dimensions, to a final dimension, each dimension of the second set of dimensions having a plurality of values, the second set of dimensions associated with the field data;

causing display on a display screen with a periphery having first, second, third, and fourth edges, the first and third edges parallel, and the second and fourth edges parallel, the display of values of the vertical controlling dimension in a vertical controlling dimension column along the first edge, display of values of the horizontal controlling dimension in a horizontal controlling dimension row along the second edge, and a matrix of cells locatable by intersections between values of the vertical controlling dimension column and values of the horizontal controlling dimension row, each cell populated based on a respective aggregation of the field data determined by the values locating that cell;

detecting a selection by a user of any displayed value;

responsive to the selected value being from the vertical controlling dimension, assigning the controlling vertical dimension as a previous controlling vertical dimension, assigning a subsequent intermediate dimension of the first set as the controlling vertical dimension, displaying values of the controlling vertical dimension in the vertical controlling dimension column, displaying the identifier for the previous controlling vertical dimension in a vertical dimension navigation tab, and updating the array locations to display an aggregation of the field data based on the updated values of the controlling vertical dimension;

responsive to the selected value being from the horizontal controlling dimension, assigning the controlling horizontal dimension as a previous controlling horizontal dimension, assigning a subsequent intermediate dimension of the second set as the controlling horizontal dimension, displaying values of the controlling horizontal dimension in the horizontal controlling dimension row, displaying the identifier for the previous controlling horizontal dimension in a horizontal dimension navigation tab, and updating the array locations to display an aggregation of the field data based on the updated values of the controlling horizontal dimension; and continuing with the detecting.

7. The computer readable medium of claim 6, wherein the method further comprises detecting a selection of the vertical dimension navigation tab, and responsive to the detecting, assigning the previous controlling vertical dimension as the controlling vertical dimension, displaying values for the updated controlling vertical dimension in the controlling vertical dimension column, and updating the array locations.

8. The computer readable medium of claim 6, wherein the method further comprises detecting a selection of the horizontal dimension navigation tab, and responsive to the detecting, assigning the previous controlling horizontal dimension as the controlling horizontal dimension, displaying values for the updated controlling horizontal dimension in the controlling horizontal dimension row, and updating the array locations.

9. The computer readable medium of claim 6, wherein the display is associated with a mobile device.

* * * * *

UNITED STATES PATENT AND TRADEMARK OFFICE
CERTIFICATE OF CORRECTION

| | |
|---|---|
| PATENT NO. | : 8,127,223 B2 |
| APPLICATION NO. | : 12/197893 |
| DATED | : February 28, 2012 |
| INVENTOR(S) | : Santiago Becerra, Sr. et al. |

It is certified that error appears in the above-identified patent and that said Letters Patent is hereby corrected as shown below:

Column 15, line 43, after "repeating;" add "steps of forming the matrix, displaying the tab column, displaying the tab row, and displaying the matrix".

Signed and Sealed this
Eleventh Day of September, 2012

David J. Kappos
*Director of the United States Patent and Trademark Office*